United States Patent
Faye et al.

(10) Patent No.: US 7,335,433 B2
(45) Date of Patent: Feb. 26, 2008

(54) VEHICLE WITH ENERGY CONVERTER

(75) Inventors: Ian Faye, Stuttgart (DE); Rainer Saliger, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 494 days.

(21) Appl. No.: 10/762,412

(22) Filed: Jan. 22, 2004

(65) Prior Publication Data
US 2004/0149503 A1 Aug. 5, 2004

(30) Foreign Application Priority Data
Feb. 3, 2003 (DE) ................ 103 04 136

(51) Int. Cl.
- *H01M 8/04* (2006.01)
- *H01M 8/18* (2006.01)
- *H01M 8/00* (2006.01)

(52) U.S. Cl. .................. 429/26; 429/20; 429/12; 429/13

(58) Field of Classification Search ........... 429/12, 429/13
See application file for complete search history.

(56) References Cited

U.S. PATENT DOCUMENTS 4,386,309 A * 5/1983 Peschka ............... 322/2 R
5,706,675 A * 1/1998 Manikowski, Jr. ......... 62/645

\* cited by examiner

*Primary Examiner*—Patrick Joseph Ryan
*Assistant Examiner*—Thomas H. Parsons
(74) *Attorney, Agent, or Firm*—Michael J. Striker

(57) ABSTRACT

A vehicle with a device (6) for converting chemical energy into electrical and/or mechanical energy, in particular a fuel cell unit (6) and/or combustion device (6), such as a diesel or gas engine (6), whereby at least one oxygen-containing source mixture is proved. The efficiency of the energy conversion, in particular, for protection of the environment, is improved relative to the state of the art. This is achieved according to the present invention, in that a separator (7) for separating off at least one oxygen-enriched fluid (2) from a fluid residue (3) of the source mixture (1) is provided.

9 Claims, 1 Drawing Sheet

VEHICLE WITH ENERGY CONVERTER

BACKGROUND OF THE INVENTION

The present invention relates to a vehicle with a device for converting chemical energy into electrical and/or mechanical energy.

Presently, there are different vehicles in use, in particular, land, water, and/or air vehicles, which have, for example, a thermal engine, such as a combustion engine, turbine, or the like, or a fuel cell with an electric motor, for production of the drive energy from the chemical energy of a combustible or fuel. Generally, the fuel is converted in an oxidative manner, whereby, preferably, atmospheric air is used. With the combustion or oxidation of the fuel with the oxygen-containing air, among other things, water, carbon dioxide, nitrogen oxides, etc., are produced.

For example, based on environmental considerations, in recent years, in particular, the specifications for the efficiency of the energy conversion as well as the environmental relevance of the exhaust continuously increase.

SUMMARY OF THE INVENTION

An object of the invention, on the other hand, is to propose a vehicle with a device for conversion of chemical energy into electrical and/or mechanical energy, in particular, fuel cells and/or combustion devices, such as diesel or gas motors, whereby at least one oxygen-containing source mixture is provided, whereby, primarily, the efficiency of the energy conversion for protection of the environment is increased relative to the state of the art.

This object is solved with a vehicle of the above-described type according to the present invention.

Accordingly, the vehicle of the present invention is characterized in that at least one separator for separating off at least one oxygen-enriched fluid from a fluid residue of a source mixture is provided. Preferably, the oxygen-enriched fluid or the oxygen is obtained from atmospheric air, advantageously separated from the residual air by means of the separator, and supplied generally from this separator to the device for energy conversion or the combustion device and/or fuel cell unit. With the aid of oxygen-enrichment, the combustion or oxidation in the energy converter is substantially more efficient or improved relative to the state of the art, based on the increase of the proportion of oxygen on the total flow. Likewise, nearly pure oxygen as the fluid for the energy converter is produced or used. In addition, according to the present invention, for example, the development of nitrogen oxide as a waste product is drastically reduced.

By oxygen-enrichment or increase of the oxygen proportion on the total flow, a substantial reduction of equipment or equipment components can be realized in an advantageous manner, for example, to approximately a factor of four smaller components than the state of the art. In this manner, in addition to the reduction of the weight of the components inclusive of the likewise connection fuel or combustible usage, the constructive expense as well as the financial expense is reduced in an advantageous manner.

The oxygen-enriched fluid or the nearly pure oxygen, according to the present invention, is used in particular for production of the drive energy and/or the electrical energy for supplying electrical components of the vehicle.

Generally, different physical and/or chemical separating methods for making the oxygen-enriched fluid are contemplated, such as, for example, the use of a membrane separator, whereby a semi-permeable membrane is formed to be permeable nearly exclusively for oxygen or oxygen molecules.

In a preferred variation of the invention, the separator has at least one oxygen separator or an oxygen condensation unit for separating off or condensing oxygen from the source material mixture. Advantageously, by condensation of the air by means of the separator or the condensation unit, nearly pure oxygen can be obtained, in particular, from atmospheric air.

Advantageously, a cooling device is provided, with the aid of which the oxygen-containing source material mixture or the atmospheric air can be cooled at least to under the boiling pint of the oxygen. For example, the air condenses with a temperature of approximately −183° C. with a pressure of approximately 1 bar.

In an advantageous manner, the oxygen-containing source mixture or the air is cooled to approximately over the boiling point of nitrogen, which, for example, lies at a pressure of 1 bar at a temperature of approximately −196° C. In this manner, an advantageous separation of the liquid oxygen from the still substantially gaseous nitrogen can be realized advantageously. This means that the air within the provided "condensation window" is tempered from approximately 13 Kelvin at a pressure of approximately 1 bar, whereby the oxygen-nitrogen separation can be realized advantageously as a fluid/gas separation.

In practice, it has been shown, for example, that with the condensing-out of air in one step with a temperature of approximately −191° C., a gas or fluid residue exists, which contains approximately 6% oxygen $O_2$. In an advantageous variation of the invention, for example, by means of a connection or coupling, multiple separators and/or separating steps preferably can be produced in the manner of a cascade one after another of nearly pure oxygen. Generally, the enrichment operates, such that with somewhat higher temperatures, that is, which are approximately at the condensation temperature of oxygen, the oxygen portion can be increased in the liquid phase or in the fluid phase.

The oxygen-enriched fluid produced by means of the oxygen condensation unit can be designated, for example, as so-called "cryo-operating supply material", which means that the boiling point of the operating supply material lies beneath the ambient temperature.

In a particular further embodiment of the invention, the separator includes at least one heat exchanger for heat exchanging with a cooling medium. In this manner, in an advantageous manner, the cooling or condensation of the source mixture can be realized in an advantageous manner.

In an advantageous embodiment of the invention, the heat energy of the heat exchanger to be transferred can be controlled, for example, by means of electronic control unit, at least one control valve, or a controllable throttle and/or the like. With the assistance of these features, an advantageous adaptation on the volume of the oxygen-enriched fluid to be produced can be realized as a function of the operating conditions of the vehicle. Vehicles demonstrate generally particularly dynamically-changed operating conditions during their operation. Accordingly, differently-sized operating streams or flows, such as the oxygen-enriched fluid or the fuel are required.

Advantageously, at least one branching or diverting element for separating or splitting up the cooling medium into at least two separate partial flows is arranged in the flow direction of the cooling medium before the heat exchanger. A correspondingly advantageously formed branch connection element permits the production of a separate partial flow, with whose assistance, the separating or condensation of the oxygen from the source mixture or the air can be controlled in an advantageous manner, without changing the total amount of the flowing cooling medium. This is of particular advantage in situations, in which the entire volume of the cooling medium depends essentially from different operating conditions or components of the vehicle, that is, not subordinate to or only subordinate to the enrichment.

In a further embodiment of the invention, on the branch connection element, a cooling medium bypass of the heat exchange is arranged. With the assistance of the cooling medium bypass, conducting of the heat exchanger for one of the separate partial flows can be realized, so that, for example, by means of the electronic control unit or at least one control valve, controllable throttle, or the like, the partial flow of the cooling medium flowing through the heat exchanger can be controlled as a function of the operating conditions of the enrichment. In this regard, preferably the entire amount of the cooling medium in the flow direction behind the heat exchanger is not changed essentially in dependence on the fluid amount.

At present, already different fuels for combustion engines, turbines, fuel cells, etc., are used in vehicles. In this manner, among other things, also so-called "cryo-fuels", that is, fuels whose boiling points lie beneath the ambient temperature, are increasingly used as energy carriers, for example, for driving vehicles, such as trucks, busses, and/or passenger vehicles. For example, liquid gas (LNG), liquid hydrogen (LH2), methane, ethene, ethane, or the like serve as cryo-fuels.

In an advantageous variation of the invention, the cooling medium is formed as cryo-fuel, preferably, the cooling medium comprises essentially hydrogen. By means of the use of the likewise already provided cryo-fuel on board of the vehicle, no additional cooling medium in particular is necessary, whereby the technical-process expense as well as the constructive expense are drastically reduced in a vehicle according to the present invention. For example, a separate fueling or storage of the cooling medium is dispensed with, whereby, in particular, the disassembly of a corresponding fueling infrastructure can be done away with.

Advantageously, at least one fluid reservoir for storage of liquid hydrogen (LH2) is provided. In this manner, the cryo-fuel or combustible can be stored with comparably high energy density on board of the vehicle. Hydrogen, for example, can be stored at temperatures of approximately −253° C. in liquid form in vehicles.

Generally, a corresponding liquid reservoir has at least one thermal insulation. For example, at least one insulating coating of the liquid reservoir is provided for thermal insulation. Possibly, the insulating coating comprises multiple, insulation layers, preferably, substantially separated to the greatest possible extent. Likewise, at least one insulating layer is partially evacuated, partially filled with liquid nitrogen and/or the like.

Advantageously, the liquid reservoir has at least on insulating device enclosing the fluid residue and/or at least one insulating unit enclosing the oxygen-enriched fluid for thermal insulation. With this feature, the fluid, fluid residue and/or source mixture intensely cooled by means of the heat exchanger in part can be used for thermal insulation of the fluid reservoir relative to the ambient temperatures.

Generally, the temperature of the fluid reservoir increases from the interior to the exterior. The outer insulating layers or plies comprise, for example, a mantle made from liquid nitrogen, for example, at temperatures of approximately −196° C., and a further, likewise evacuated insulating layer. Likewise, in outer or inner plies or insulating layers bordering thereon and/or at the outlet of the liquid or deeply cooled hydrogen, prevailing conditions or temperatures, which are needed for condensing-out of oxygen or for condensing-out of air, can be used. For example, the condensed, oxygen-enriched air, as well as the remaining, at least still partially gaseous nitrogen, are used as possible further insulating layers or plies in the tank system.

Basically, for storage of the oxygen-enriched fluid and/or the fluid residue, respectively, at least one separate reservoir can be provided on board the vehicle. Corresponding reservoirs make possible in an advantageous manner a substantial temporal decoupling from the production of the respective operating supply material and the respective usage.

Generally, the vehicle has at least one temperature and/or pressure sensor, whereby in an advantageous manner, the operating conditions for separating off the oxygen-enriched fluid from the fluid residue of the source mixture can be controlled. Advantageously, at least the heat exchanger includes at least one temperature and/or pressure sensor for determining corresponding operating parameters.

In addition, in an advantageous manner, pressure production devices, such as pumps, compressors, blowers, or the like can be provided, whereby, for example, the source mixture, the cooling medium, the fuel or combustible and/or the like can be used advantageously for operating the vehicle.

DETAILED DESCRIPTION OF THE PREFERRED EMBODIMENTS

Figure 1:
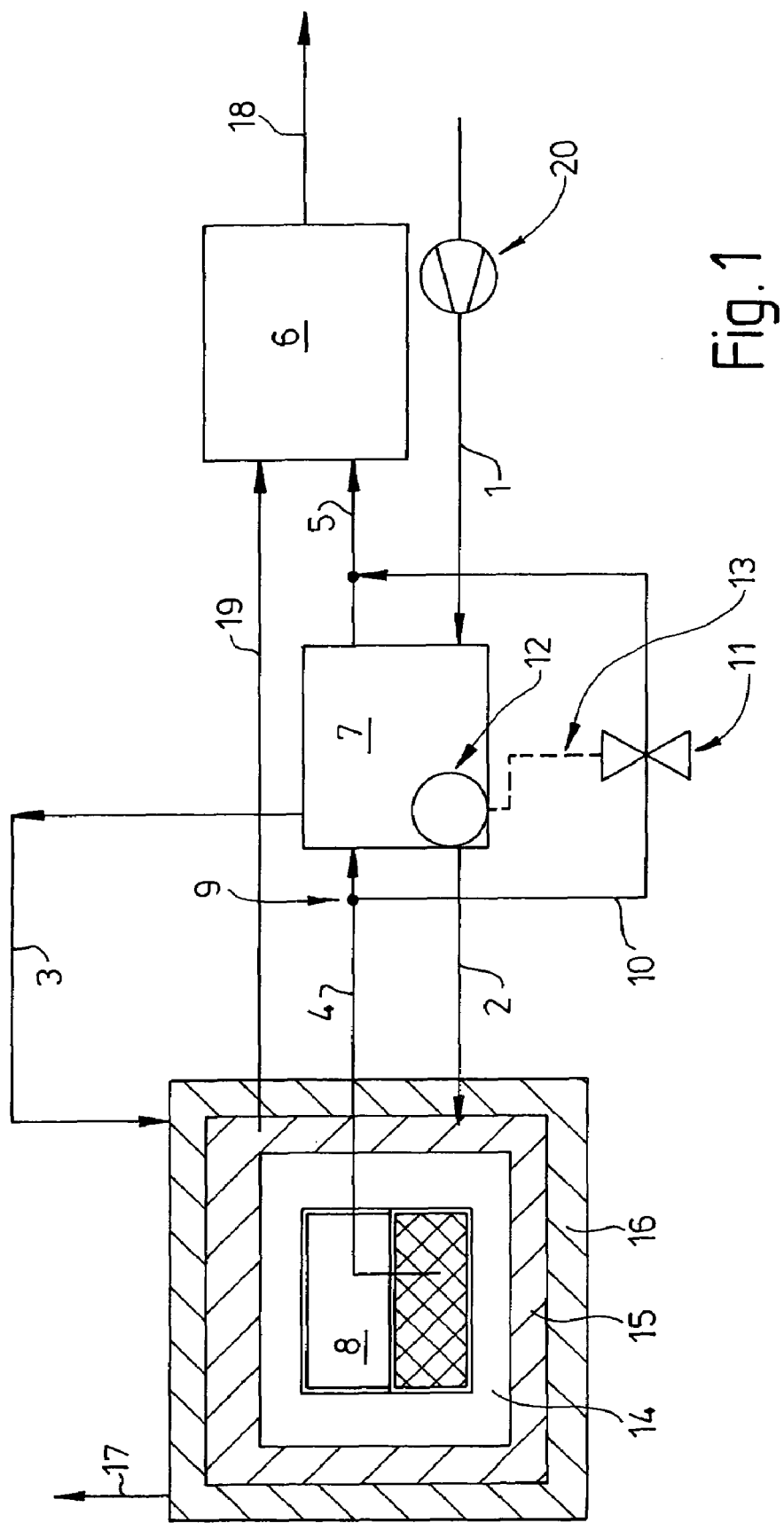
FIG. 1 is a schematic representation of the assembly or the interconnection of individual components of a vehicle according to the present invention.

In FIG. 1, an assembly or interconnection of individual components of a vehicle according to the present invention is shown schematically. An energy converter 6, in particular, fuel cell unit 6 and/or combustion engine 6, requires a fuel 5 or hydrogen 5 from a tank 8 and an oxidation agent 19 or a fluid enriched with oxygen 19. In this regard, the energy converter 6 has an outlet 18, through which exhaust or steam generally can be emitted to the environment and/or to a further treatment.

The oxygen-enriched fluid 19 or nearly pure oxygen 19 is thereby produced by means of a separator 7 or a heat exchanger 7, such that air 1, for example, optionally by means of a compressor 20, is removed from the environment or atmosphere and is conducted through the heat exchanger 7. In addition, preferably deep-cooled or liquid hydrogen 4 is conducted from the tank 8 through the heat exchanger 7, whereby the hydrogen 4 is somewhat heated and is supplied likewise in part as gaseous hydrogen 5 to the energy converter 6.

The hydrogen 4 has temperatures of approximately −251° in the tank, in particular, so that the air in the heat exchanger 7 is cooled at least to the condensation temperature of approximately −183° C. and is portioned out or separated in an oxygen-enriched fluid 2 as well as in an oxygen-enriched or nitrogen-enriched fluid residue 3. Generally, it acts as a fluid 2 with a fluid and as a gas with the fluid residue 3, which mainly includes nitrogen 3.

Both flows 2, 3 are conducted or intermediately stored in insulation layers 15 or 16 of the tank 8. Preferably, the oxygen-enriched fluid 2 or the liquid 2 is arranged between the liquid hydrogen 4 and the gaseous fluid residue 3. From the insulation 15, the likewise pressurized oxygen 2 is removed from the insulation 15 likewise with minimal or remaining nitrogen parts for the operation of the converter machine 6 or energy converter 6. It is possible that the fluid 2 is transported into warmer regions of the vehicle in the gas phase and/or intermediately stored and supplied to the energy converter 6 when needed.

In particular, the oxygen-enriched fluid-residue 3 is further used or released to the environment or atmosphere by means of an outlet 17 generally for air conditioning of the vehicle interior and/or of the energy converter 6.

In addition, a further thermal insulation 14 can be provided between the tank 8 and the insulation 15. With specific illustration, a further thermal insulating layer or coating can be provided about the insulation 16. At least one or more insulation layers can be partially evacuated or be filled with liquid nitrogen. Generally, the temperature increases to the outside from the tank interior from approximately −253° C.

Primarily, for controlling the condensation in the heat exchanger 7, the heat exchanger 7 has a bypass 10. In this regard, the condensation of the air or the oxygen 1 can be decoupled or controlled advantageously by the amount of the hydrogen 4 flowing through the heat exchanger 7. For this purpose, a branching or branch connection element 9 is provided before the heat exchanger in the flow direction, so that the hydrogen 4 can be separated into two partial streams or flows. For example, the partial stream 10 conducted to the heat exchanger can be regulated by means of a controllable valve 11 or a throttle 11. A line 13 between the valve 11 and a sensor 12, shown only in a dotted representation, makes possible the control of the partial streams 4, 10.

The sensor 12, in particular, is formed for detection of the temperature and/or the pressure of the heat exchanger 7. Without specific illustration, further sensors for detection of temperatures or pressures, as well as an electronic control unit for controlling the entire assembly, can be provided. Generally, by means of the advantageous control of suitable conditions, that is, in particular, adjusting the pressure and temperature ratios in the heat exchanger 7, an advantageous separation of the oxygen-enriched fluid 2 from the oxygen-enriched or nitrogen-enriched fluid residue stream 3 takes place.

According to the present invention, an oxygen-enriched fluid 2 is produced on-board a vehicle and supplied to the energy converter 6. The energy converter 6 can be formed as a diesel or gas engine 6, a turbine 6, a fuel cell 6 and/or the like. Likewise, the combustion device 6 can be combined with a fuel cell 6, for example, for a hybrid drive or as a so-called APU 6. Corresponding energy conversion systems according to the present invention can be used in tankers or LKWs, which, in particular transport liquid hydrogen and the like, in PKWs, airplanes, submarines, and so on.

Generally, the oxygen 2 or oxygen-enriched fluid 2 produced and separated according to the present invention can lead to a minimization of the energy converter 6 and/or its peripherals, such as intake modules, compressors, reformers, purification stages, filters, catalyzers, etc., in an advantageous manner. In this regard, generally its efficiency is improved at the same time and emissions, for example, of $NO_x$ in particular with combustion engines 6, are reduced or eliminated to the greatest extent possible.

It will be understood that each of the elements described above, or two or more together, may also find a useful application in other types of constructions differing from the types described above.

While the invention has been illustrated and described herein as a lubricating device with pressure equalization, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A vehicle with a device for converting chemical energy into electrical energy, configured as a fuel cell unit, whereby at least one oxygen-containing source mixture is provided, comprising:
   a separator for separating off at least one oxygen-enriched fluid from a fluid residue of the source mixture, wherein the separator includes at least one heat exchanger for heat exchange with a cooling medium, and wherein the cooling medium generally comprises hydrogen.

2. The vehicle according to claim 1, wherein the separator has at least one oxygen separator for separating oxygen from the source mixture.

3. The vehicle according to claim 2, wherein the oxygen separator is formed as an oxygen condensation unit for condensation of oxygen.

4. The vehicle according to claim 1, wherein a fluid reservoir is provided for storing liquid hydrogen.

5. The vehicle according to claim 4, wherein the fluid reservoir has at least one insulating device enclosing the fluid residue for thermally insulating the fluid reservoir.

6. The vehicle according to claim 4, wherein the fluid reservoir has at least one insulating unit enclosing the oxygen-enriched fluid for thermally insulating the fluid reservoir.

7. A vehicle with a device for converting chemical energy into electrical and/or mechanical energy, in particular, a fuel cell unit and/or combustion device such as a diesel or gas engine, whereby at least one oxygen-containing source mixture is provided, comprising:
   a separator for separating off at least one oxygen-enriched fluid from a fluid residue of the source mixture, wherein the separator includes at least one heat exchanger for heat exchange with a cooling medium, wherein in a flow direction of the cooling medium, before the at least one heat exchanger, at least one branch connection element for separating the cooling medium into at least two separate partial flows is arranged.

8. The vehicle according to claim 7, wherein on the branch connection element, a cooling medium bypass of the heat exchanger is disposed.

9. The vehicle according to claim 7, wherein the cooling medium generally comprises hydrogen.

* * * * *